May 19, 1936.    G. H. HART    2,041,246
THERMOSTATIC SWITCH
Filed Sept. 4, 1934    2 Sheets-Sheet 1
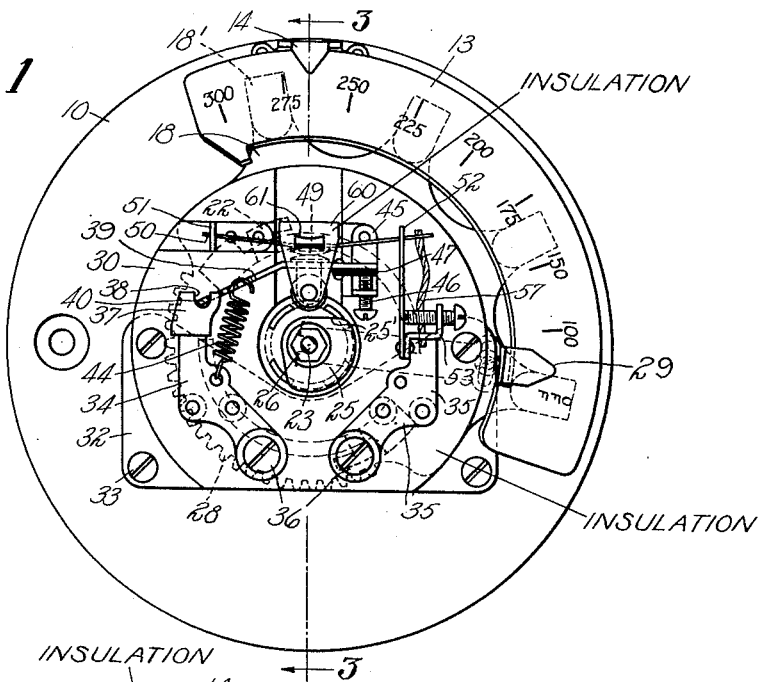
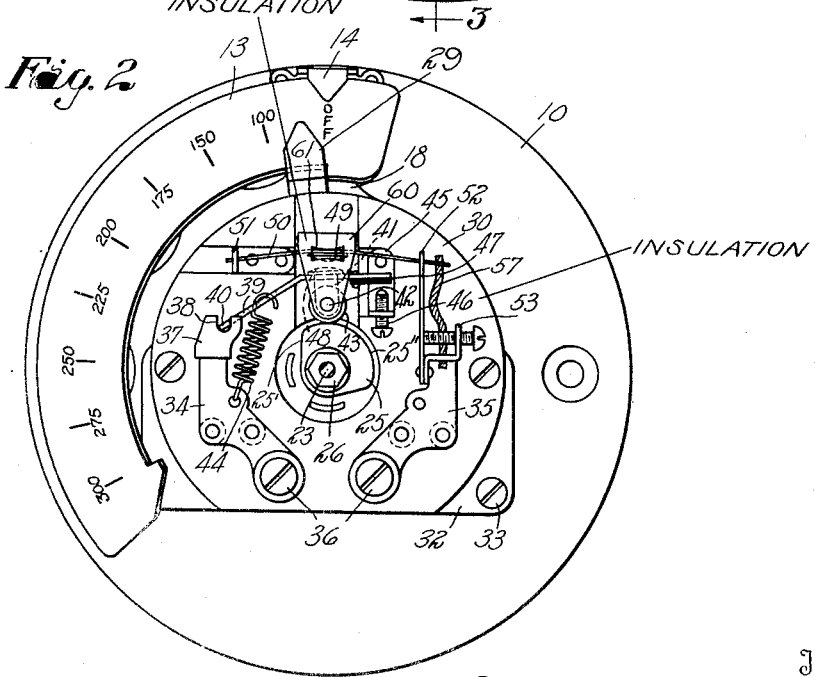
Inventor
George Hegeman Hart
By W. Clay Lindsey
Attorney May 19, 1936.  G. H. HART  2,041,246
THERMOSTATIC SWITCH
Filed Sept. 4, 1934  2 Sheets—Sheet 2

Inventor
George Hegeman Hart

By K. Clay Lindsey
Attorney

Patented May 19, 1936

2,041,246

UNITED STATES PATENT OFFICE 2,041,246

THERMOSTATIC SWITCH

George Hegeman Hart, West Hartford, Conn.

Application September 4, 1934, Serial No. 742,589

10 Claims. (Cl. 200—139)

This invention relates to improvements in thermostatic switches and has, as one of its objects, the provision of a thermostatic switch which may be used to very accurately control, within the desired limits, the temperature of water heaters, ovens, etcetera.

A further object resides in the provision of a thermostatic switch of the character described which is positive in operation and effective and durable in use.

A still further object resides in the provision of a thermostatic switch of the character described which is simple in construction and economical to manufacture.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein is shown one embodiment which the present invention may take:

Figure 1 is a front elevational view of a thermostatic switch constructed according to the idea of this invention, the cover of the switch being removed to better illustrate the construction thereof, and the switch elements being shown in the "on" position;

Fig. 2 is a view similar to Fig. 1 showing the switch element in the "off" position;

Figures 3, 4:
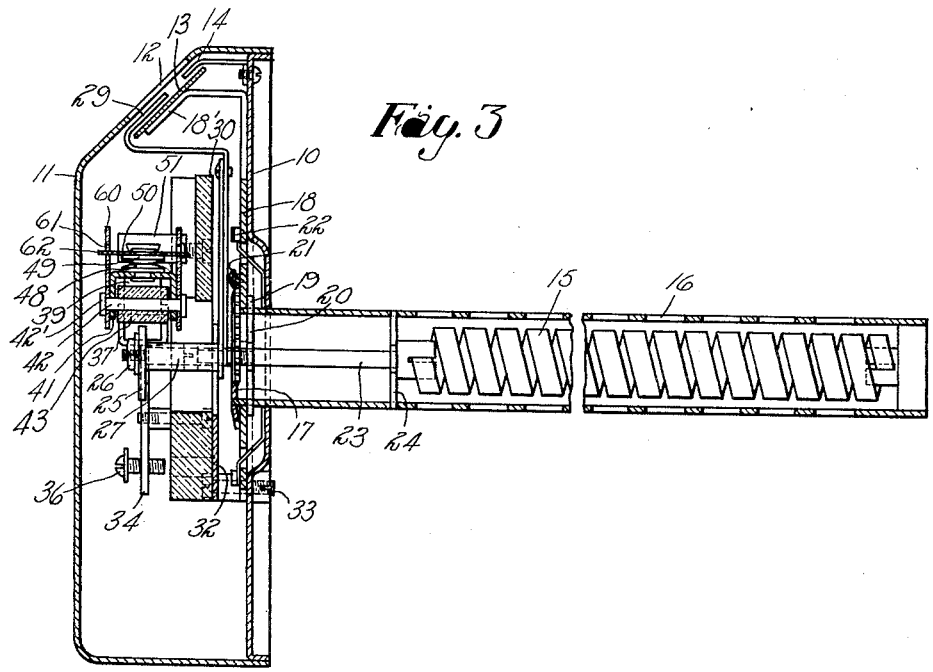
Fig. 3 is a sectional view on the line 3—3 of Fig. 1.
Fig. 4 is a plan view of the switch mechanism separated from the thermostat and casing.

Referring to the drawings in detail, I have shown the thermostatic switch as having a casing which may include a base plate 10 and a cover 11. The cover is provided with an arcuate slot 12 through which an adjustable scale or dial 13 may be observed. 14 designates a fixed pointer within the opening and relative to which the scale may be set according to any desired operating temperature to be maintained within the oven or chamber.

The thermostatic element may be of any suitable form, but is here shown as comprising a helical bimetallic coil 15 mounted within, and having its rear end connected to, a rotatably adjustable perforated tubular cage 16. The forward end of the tube extends through an opening in the base 10 and carries a toothed disk 17. 18 designates a plate having fingers 18' which carry the scale 13. This plate engages the front surface of the base and has an opening through which the cage 16 extends. The edge of this opening is positioned between the toothed disk 17 and the projecting ears 19 of a plate 20 carried by the cage. A screw 21 is carried by the plate 18 and is adapted to selectively engage the teeth of the disk 17. To calibrate the device, the screw 21 is loosened, the plate 18 and scale are adjusted relative to the cage and toothed disk, and then the screw is tightened up. The plate 18 is frictionally held against the base plate of the casing by a spring 22. The forward end of the thermostatic element is connected to a shaft 23 which rotatably extends through openings in a partition 24 and the members 17 and 20.

Fixed to the forward end of the shaft 23 is a cam 25 of more or less quadrant shape, the same having a rise portion 25' and a concentric portion 25". In the present instance, the extreme forward end of the shaft is flattened on opposite sides, and the cam has an opening corresponding in size and shape to, and receiving, this flattened portion. A nut 26 screwed onto the forward end of the shaft holds the cam on the shaft. Between the cam and the disk 17 and about the shaft is a sleeve 27. The angularly adjustable unit which includes the thermostatic element, the case, the scale, and the cam 25 may be set in any desired manner. For example, the plate 18 may have a concentric segment provided with teeth 28 with which meshes a manually rotatable pinion (not shown). Suitably fixed to the shaft, so as to turn therewith, is a pointer 29 adapted to cooperate with the scale 13 for indicating the temperature within the apparatus to be controlled.

Located within the casing is a switch support which is in the form of a disk 30 of insulating material and having a central opening through which the shaft 23 extends. This disk may be secured to the base plate of the casing in any suitable manner, as by means of a metallic plate 32 and screws 33. Secured to the disk 30 are terminal members 34 and 35 provided with binding screws 36 by means of which the circuit wires may be connected to the respective members. The upper end of the terminal 34 has a pair of arms 37 provided with notches 38 which form bearings or seats for a contact carrying lever 39. This lever has a pair of oppositely extending ears 40 engaging in these seats. The lever is provided with a pair of depending ears 41 through which extends a pin 42 on which is journaled a roller 43 adapted to engage the periphery of the cam. The roller is resiliently urged towards the cam by a spring 44 connected at its opposite ends to the lever and the terminal 34. Secured to the insulating support 30 is a bracket 45 carrying an adjustable screw 46, and on the under side of the free end of the lever is a piece of insulation 47 adapted to engage the upper end of the screw 46, whereby the downward movement of the lever, under the urge of the spring 44, is limited. Carried by the lever is a contact 48 which is preferably in the form of a button of silver, or other metal which will not corrode or pit over a long period of use.

The other contact 49 is fixed to the central portion of the toggle spring 50 which is supported at its opposite ends by a bracket 51 and a leaf spring 52 in such manner that the toggle spring is under longitudinal compression so that it will snap from one side to the other side of a plane passing through the supporting ends of the spring. The bracket 51 is secured to the insulating support 30. The leaf spring 52 is secured at its lower end to a Z-shaped portion 53 provided on the upper end of the terminal 35. The opposite ends of the toggle spring are of reduced width so as to provide ears 54 and shoulders 55 at the bases of the ears. The bracket 51 and the free end of the leaf spring 52 are slotted so as to receive these ears, and the shoulders 55 abut against the opposed faces of these members. Carried by the Z-shaped portion 53 is an adjustable screw adapted to bear against the leaf spring 52, whereby the compressional strains on the toggle spring may be adjusted. The end of the toggle spring may be electrically connected to the terminal 35 by a flexible connection 57.

For the purposes of limiting the extent of relative movement between the two contacts 48 and 49, and for moving the upper contact 49 downwardly upon downward movement of the lever 39, the lever 39 is operatively connected to the toggle spring by means of a pair of plates 60 of insulating material. In the present illustrative disclosure, the pin 42 extends through the lower ends of these plates, and the ends of the pin are headed or peened, as at 42', so as to hold the plates in place. The plates, adjacent their upper ends, are provided with elongated openings 61, and these openings respectively receive lugs or ears 62 extending from opposite sides of the central portion of the toggle spring. The slots are wider than the thickness of the lugs which they receive in order to permit the desired separation of the contact members when the switch is open.

The operation of the device is briefly as follows: the temperature (say 275°) to which the oven or other mechanism or chamber is to be heated having been determined, the adjustable unit, including the scale, the cage, the thermostatic element, and the cam is turned until the indication 275 of the scale is opposite the pointer 14. Thus the distance between the roller 43 and the rise portion of the cam is set. The free end of the lever 39 rests upon the screw 46 and the contacts are in engagement. The heating element within the oven is now on. As the temperature of the oven rises, the thermostatic element will turn the cam 25 counterclockwise. As the forward edge 25' of the cam engages the roller, the lever is caused to move upwardly. The two contacts will remain in engagement until the toggle spring has been moved slightly past center, whereupon the spring will snap upwardly, thus separating the contacts and breaking the circuit. When the toggle spring snaps upwardly, the lugs 62 thereof will engage the upper edges of the slots 61 so that the extent of movement between the two contacts is limited; and thus excessive arcing is prevented. In the event that the heat within the oven should continue to rise (that is, "overrun"), no strains would be placed on the thermostatic element nor the switch parts, as the roller would merely ride upon the concentric portion 25'' of the cam. The heat having been discontinued, the temperature of the oven drops, with the result that the thermostatic element will turn the cam clockwise until the concentric portion of the cam is withdrawn from beneath the roller, whereupon the spring 44 will pull the lever downwardly until the free end of the lever engages the screw 47. When the lever thus moves downwardly, the toggle spring is bent down in its center due to the engagement of the upper edges of the slots 61 against the lugs 62, and when the spring has been flexed downwardly to such an extent that its central portion is past center, it will snap down to the position shown in Fig. 1. The heat is now on, and the described cycle of operation can be repeated. The device described may be employed for manually turning the current on and off at any time, and to this end the concentric portion 25'' of the cam is of such extent that when the scale is moved to its extreme counterclockwise position, as shown in Fig. 2, the roller rests upon the concentric portion of the cam and any movement imparted to the cam by the thermostatic element will not be sufficient to remove the concentric portion of the cam from beneath the roller.

From the above description, it will be observed that I have provided a thermostatic switch which is simple in construction, economical to manufacture and easy to install; which is simple in operation and setting, and durable in use; which will avoid excessive arcing, particularly when used in connection with alternating currents, and which eliminates the use of an additional switch for making and breaking the current to the heating elements of the oven with which the thermostatic switch is associated.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A thermostatic switch comprising a thermostatic element arranged to angularly rotate a cam under the influence of temperature changes, a movable contact member actuated by said cam, an electrical contact on said contact member, means resiliently urging the contact member towards the cam, a toggle spring supported at its opposite ends under compression and arranged to snap past center, and a contact secured to the toggle spring engageable with said first contact to make and break an electrical connection therebetween.

2. In a thermostatic switch, a thermostatically operated shaft, a cam on said shaft, a lever having a member adapted to engage the periphery of said cam, means for urging said lever towards said cam, a contact on said lever, a toggle spring supported adjacent its opposite ends under longitudinal compression and arranged to snap from one side to the other side of a plane passing through the supported ends of the spring, and a contact carried by the central portion of said spring and adapted to engage said first contact.

3. In a thermostatic switch, a thermostatically operated shaft, a cam on said shaft and having a rise portion and a concentric portion, a toggle spring supported adjacent its opposite ends under longitudinal compression and arranged to snap from one side to the other side of a plane passing through the supported ends of the spring, a contact carried by the central portion of said spring, a pivoted lever between said spring and cam, a member carried by said lever and adapted to engage the periphery of said cam, a contact on said lever cooperating with said first mentioned contact, and adjustable means for limiting the extent of movement of said lever towards said cam.

4. In a thermostatic switch, a thermostatically operated shaft, a cam on said shaft, a toggle spring supported adjacent its oposite ends under longitudinal compression and arranged to snap from one side to the other side of a plane passing through the supported ends of the spring, a contact carried by the central portion of said spring, a pivoted lever between said contact and said cam and having a roller adapted to engage the periphery of said cam, a spring normally urging said roller towards said cam, a contact on said lever adapted to cooperate with said first contact, and connecting means between said lever and toggle spring for limiting the extent of movement between said contacts.

5. A thermostatic switch comprising a thermostatic element arranged to angularly rotate a shaft under the influence of variations in temperature, a cam secured to said shaft for angular movement therewith, a movable contact member actuated by said cam, a contact on said member, manually operable means for angularly positioning the thermostatic element and cam relative to the contact member, a toggle spring supported at its opposite ends under compression and arranged to snap past center, and a contact secured to the toggle spring engageable with said first named contact.

6. In a thermostatic switch, a thermostatically operated shaft, a cam on said shaft, a toggle spring supported adjacent its opposite ends under longitudinal compression and arranged to snap from one side to the other side of a plane passing through the supported ends of the spring, a contact carried by the central portion of said spring, a pivoted lever between said cam and spring and having a contact cooperating with said first contact, means for urging said lever towards said cam, and a connecting link between said spring and lever for limiting the extent of movement therebetween.

7. In a thermostatic switch, a thermostatically operated shaft, a cam on said shaft, a pair of supporting members, a toggle spring supported by said supporting members and carrying a contact between its ends, the effective length of said spring being greater than the distance between said supporting members whereby said spring will snap from one side to the other side of a given plane, means for relatively adjusting said supporting members, a pivoted lever between said spring and cam and having a contact adapted to cooperate with said first contact, a roller carried by said lever and adapted to engage said cam, and a lost motion connection between said lever and toggle spring for limiting the extent of movement therebetween.

8. In a thermostatic switch, a thermostatically operated shaft, a cam on said shaft, a toggle spring supported adjacent its opposite ends under longitudinal compression and arranged to snap from one side to the other side of a plane passing through the supported ends of the spring, a contact carried by the central portion of said spring, a pivoted lever between said cam and spring and having a contact cooperating with said first contact, means for urging said lever towards said cam, and a member of insulating material connected to said lever and having a lost motion connection with said spring.

9. In a thermostatic switch, a thermostatically operated shaft, a cam on said shaft, a toggle spring supported adjacent its opposite end under longitudinal compression and arranged to snap from one side to the other side of a given plane, a contact carried by the central portion of said spring, a pivoted lever between said cam and spring and having a contact cooperating with said first contact, a roller carried by said lever and adapted to engage the periphery of said cam, a spring normally urging said lever towards said cam, an insulating member connected to said lever and having a slot, said spring having a lug engaging in said slot and having limited movement therein.

10. In a thermostatic switch, a thermostatically operated shaft, a cam on said shaft, a pair of spaced supporting members one of which comprises a leaf spring anchored at one end, means for adjusting the free end of said spring relative to the other supporting member, a toggle spring supported by said members and carrying a contact at its central portion, the effective length of said toggle spring being greater than the distance between said supporting members whereby said spring will snap from one side to the other side of a given plane, a pivoted lever between said toggle spring and cam and having a contact adapted to cooperate with said first contact, and means carried by said lever and adapted to engage said cam.

GEORGE HEGEMAN HART.